(12) United States Patent
Wu (10) Patent No.: US 7,837,488 B2
(45) Date of Patent: Nov. 23, 2010

(54) ELECTRICAL CARD CONNECTOR WITH IMPROVED DETECTING SWITCH

(75) Inventor: Chun-Kwan Wu, Tu-cheng (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 0 days.

(21) Appl. No.: 12/387,083

(22) Filed: Apr. 28, 2009

(65) Prior Publication Data

US 2009/0286416 A1 Nov. 19, 2009

(30) Foreign Application Priority Data

May 13, 2008 (CN) .................. 2008 2 0116882

(51) Int. Cl.
*H01R 29/00* (2006.01)
(52) U.S. Cl. .................. 439/188; 439/327; 439/331
(58) Field of Classification Search .................. 439/188, 439/489, 325–327, 331
See application file for complete search history.

(56) References Cited

U.S. PATENT DOCUMENTS

| | | | | |
|---|---|---|---|---|
| 6,004,155 A * | 12/1999 | Wu | ............... | 439/489 |
| 6,394,827 B2 * | 5/2002 | Nogami | ............... | 439/159 |
| 6,425,775 B1 * | 7/2002 | Chang et al. | ............... | 439/188 |
| 6,431,893 B1 * | 8/2002 | Chang et al. | ............... | 439/188 |
| 6,688,899 B2 * | 2/2004 | Rumpel | ............... | 439/188 |
| 6,692,277 B2 * | 2/2004 | Hu et al. | ............... | 439/188 |
| 6,764,327 B2 * | 7/2004 | Yu | ............... | 439/188 |
| 6,951,470 B1 * | 10/2005 | Huang | ............... | 439/159 |
| 7,004,774 B2 * | 2/2006 | Chia-Chen | ............... | 439/188 |
| 7,160,129 B2 | 1/2007 | Yin | | |
| 7,270,559 B1 * | 9/2007 | Chen | ............... | 439/326 |
| 7,435,119 B2 * | 10/2008 | Chang et al. | ............... | 439/188 |
| 7,473,115 B2 * | 1/2009 | Yu et al. | ............... | 439/188 |
| 7,686,633 B2 * | 3/2010 | Yu et al. | ............... | 439/188 |
| 2003/0236013 A1 * | 12/2003 | Hu et al. | ............... | 439/188 |
| 2004/0180564 A1 * | 9/2004 | Chia-Chen | ............... | 439/188 |
| 2004/0219813 A1 * | 11/2004 | Chang | ............... | 439/188 |
| 2008/0102680 A1 * | 5/2008 | Chang et al. | ............... | 439/326 |

* cited by examiner

*Primary Examiner*—T C Patel
*Assistant Examiner*—Harshad C Patel
(74) *Attorney, Agent, or Firm*—Ming Chieh Chang; Wei Te Chung; Andrew C. Cheng (57) ABSTRACT

An electrical card connector for receiving a card comprising: an insulative Housing (1) defining a card receiving space (15), and comprising a plurality of side Portions (11, 12, 13); a plurality of contacts (5) received in the housing; and a detecting switch(3) mounted on one of the side portions (13) of the housing, and comprising a first contact (31) and a second contact (32), the second contact forming an engaging portion extending into the receiving space; and the first contact and the second contact being closed after the card being inserted into the receiving space in a vertical direction.

16 Claims, 10 Drawing Sheets

ELECTRICAL CARD CONNECTOR WITH IMPROVED DETECTING SWITCH

BACKGROUND OF THE INVENTION

1. Field of the Invention

The present invention generally relates to an electrical card connector, and more specially to an electrical card connector having a detecting switch for detecting full inserting of an electrical card in a vertical direction.

2. Description of Prior Art

A SIM (Subscriber Identity Module) card connector is always used in a mobile phone for connecting a SIM card to a PCB (Printed Circuit Board) electrically, and it commonly comprises an insulative housing, a plurality of contacts received in the housing, a shell covering the housing and a receiving space defined by the housing and shell. Respective ends of the contacts extend into the receiving space for contacting with an inserted SIM card, and the other ends of the contacts are soldered on the PCB. The shell can rotate around the housing to be open or closed. The shell is rotationally assembled to the housing such that the shell can be rotated to the housing to close the receiving space, or rotated away from the housing to open the receiving space. The SIM card can be disposed into the receiving space in a front-to-back direction when the shell is located at the opened position, and then the shell can be rotated with respect to the housing and is retained to the housing finally. Actually, some of the contacts of the SIM card connector are used as a detecting switch for detecting whether the card is fully inserted or not, and the rest contacts are used for retrieving information from the SIM card or supplying power to the SIM card. So the contacts play different functions, they need to be sorted before there are soldered on the PCB, and the design of the PCB will become complicated, accordingly.

Hence, it is desirable to have an improved card connector to overcome the above-mentioned disadvantages of the prior art.

BRIEF SUMMARY OF THE INVENTION

Accordingly, the object of the present invention is to provide an electrical card connector with a detecting switch for detecting full inserting of a card when the card is inserted in a vertical direction.

In order to achieve the above-mentioned object, an electrical card connector, for receiving a card, comprises: an insulative housing defining a card receiving space, and comprising a plurality of side portions; a plurality of contacts received in the housing; a shell rotationally assembled to the housing to between an open position or a closed position; and a detecting switch mounted on one of the side portions of the housing, the detecting switch comprising a first contact and a second contact, the second contact comprising an engaging portion projecting into the receiving space; wherein the first contact and the second contact set to an opened position before the card is inserted into the receiving space, and the first contact and the second contact are closed after the card is inserted into the receiving space in a vertical direction and engages the engaging portion.

Other objects, advantages and novel features of the invention will become more apparent from the following detailed description of the present embodiment when taken in conjunction with the accompanying drawings.

DETAILED DESCRIPTION OF THE INVENTION

Reference will now be made to the drawing figures to describe the present invention in detail.

Referring to FIG. 1 to FIG. 8, an electrical connector 100, for receiving an electrical card 6, comprises an insulative housing 1, with a plurality of contacts 5 received in the housing 1 therein, a shell 2 pivotally assembled to substantially cover the housing 1, a detecting switch 3 and a pair of grounding pieces 4 located at the lateral side of the housing 1.

Referring to FIG. 1 to FIG. 6, the shell 2 comprises a top wall 21, a pair of lateral side walls 26 extending downwardly from the opposite sides of the top wall 21 and a pair of soldering pads 23 bending inwardly from the bottom of the lateral side walls 26. The lateral side wall 26 forms an axial shaft 24 at the front thereof and a latch 27 at the rear end thereof. The shell 2 further comprises a pair of retaining pieces 22 extending downwardly from the top wall 21, and the retaining piece 22 is aligned with the lateral side wall 26 in a front-to-back direction, it further forms a dimple 220.

Referring to FIG. 1 to FIG. 8, the insulative housing 1 comprises a base portion 14 and a plurality of side portions extending upwardly from the base portion 14, the side portions are referred to as a first side portion 11, a second side portion 12 and a third side portion 13. A card receiving space 15 is defined by the base portion 14 and the three side portions. The base portion 14 of the housing 1 forms a plurality of passageway 142 and an opening 141 located at the front of the passageway 142. The first side portion 11 and the second side portion 12 set a socket 122 for respectively and rotationally receiving the axial shaft 24 of the shell 2 therein, and the shell 2 can rotate clockwise and counterclockwise centered the axial shaft 24 disposed within the socket 122 to an opened position or a closed position, the axial shaft 24 can be further driven to move backwardly and is retained proximate a window 123 of the housing 1 so as to be locked to the housing or unlocked therefrom. The first side portion 11 and the second side portion 12 further define gaps 110 respectively for retaining the grounding pieces 4, and these gaps 110 are mounted at the lateral side of the side portions 11, 12. A locking member 115 is disposed at the rear end of the side portions 11, 12, respectively, which can interlock with the latches 27 of the shell 2 for locking or unlocking the shell 2. The second side portion 12 further has a fixed portion 116, and the fixed portion 116 projects into the receiving space 15 for matching up with a notch 61 of electrical card 6, and the electrical card 6 is positioned by the fixed portion 116 in the receiving space 15, and the fixed portion 116 can be used to also avoid the ejection of the card 6 in the front-to-back direction. The third side portion 13 is located at the front of the base portion 11 for holding the detecting switch 3, and it comprises a cavity 135 and a plurality of retaining gaps 131, and the cavity 135 connects with the card receiving space 15.

The detecting switch 3 comprises a first contact 31 and a second contact 32, and they are retained on the third side portion 13 transversely. The first contact 31 comprises a first connecting portion 312, a first retaining portion 311 bending from the end of the first connecting portion 312, a first soldering portion 313 bending outwardly from the bottom of the first connecting portion 312 and a first contacting portion 314 with a tuber 315. The configuration of the second contact 32 is similar to the first contact 31, and it comprises a second connecting portion 322, a second retaining portion 321, a second contacting portion 324 and a second soldering portion 323. The first contacting portion 314 and the second contacting portion 324 are disposed in the cavity 135, and the first retaining portion 311 and the second retaining portion 321 are held in the retaining gap 131. The second contact 32 further comprises an engaging portion 325 which inclines in an up-to-down direction. The detecting switch 3 is set in an opened position before the electrical card 6 is inserted into the connector 100, and the engaging portion 325 is disposed in the receiving space 15. When the electrical card 6 is inserted into the receiving space 15, the engaging portion 325 is moved from the receiving space 15 into the cavity 135, and then the second contacting portion 314 connects with the first contacting portion 324 electrically.

Figure 1:
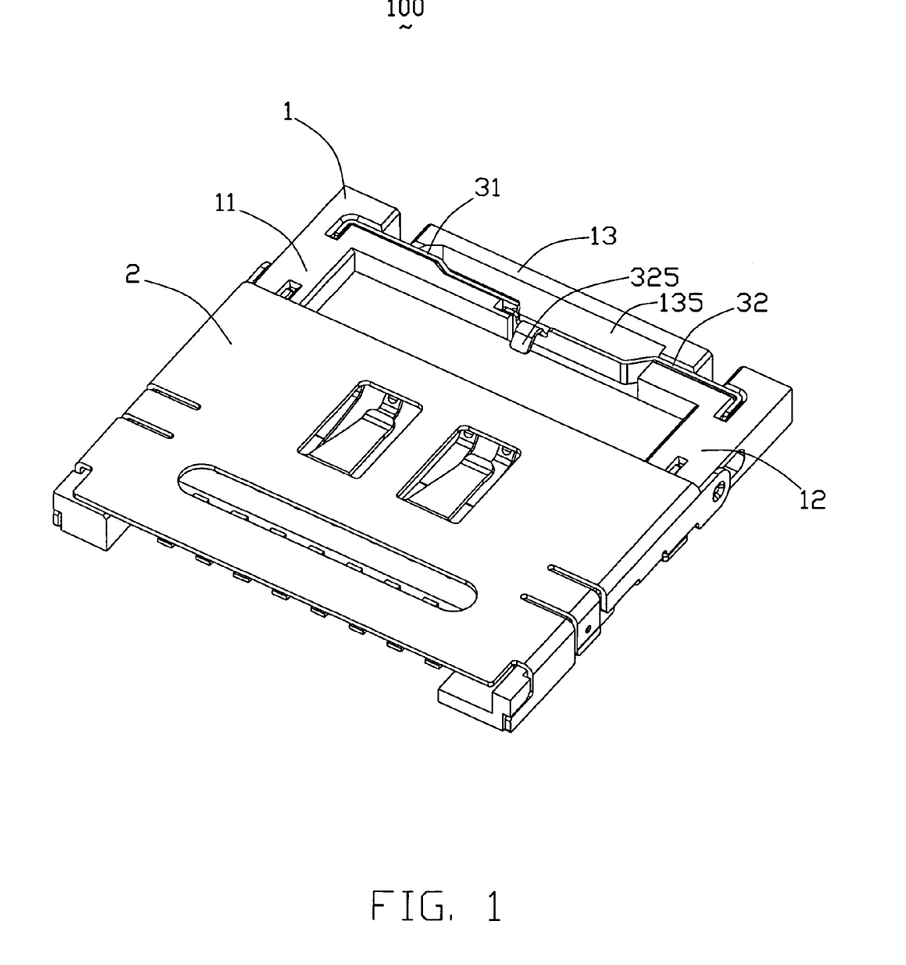
FIG. 1 is a perspective view of an electrical card connector in accordance with the present invention.
Figure 2:
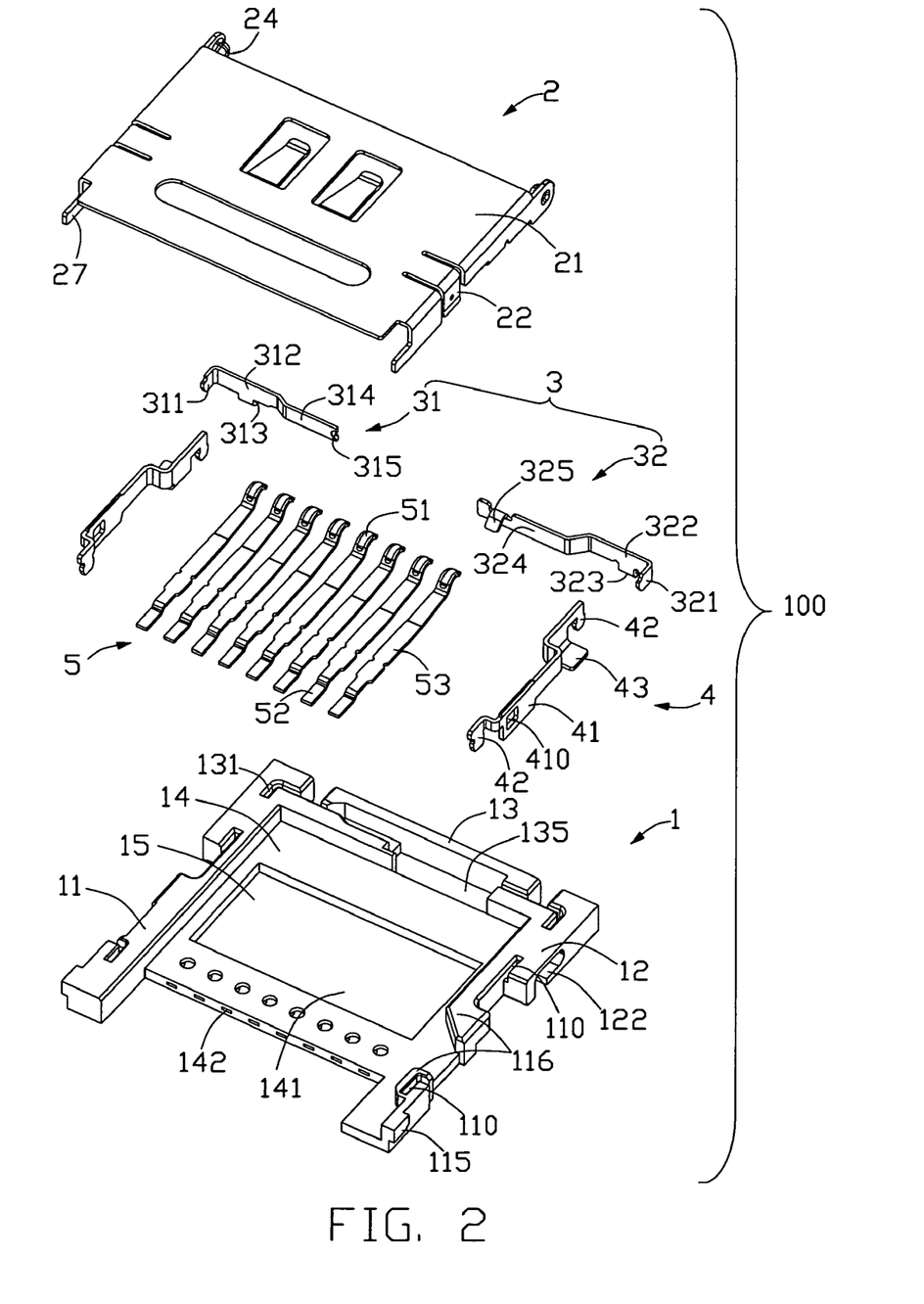
FIG. 2 is an exploded, perspective view of the electrical card connector shown in FIG. 1.
Figure 3:
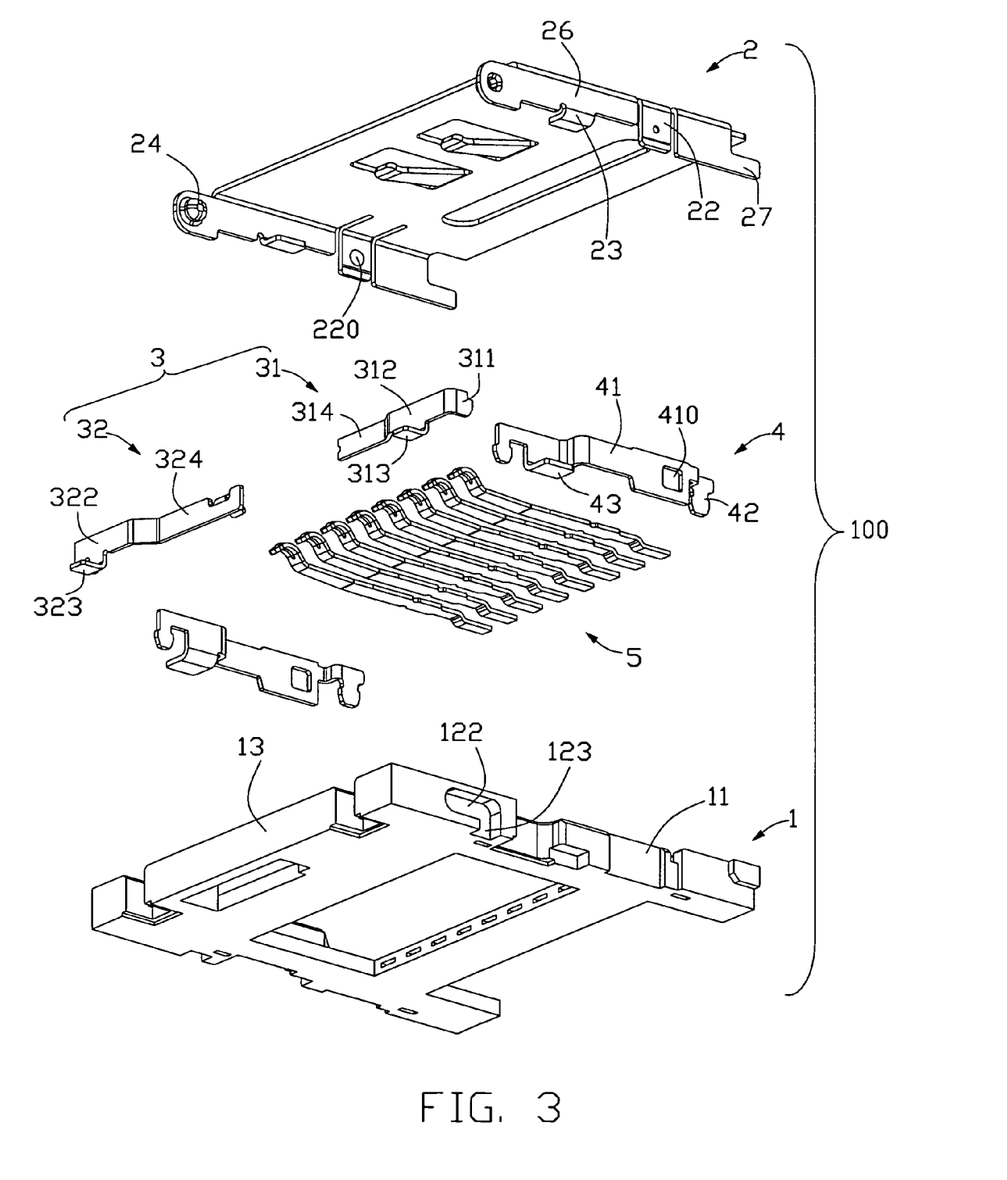
FIG. 3 is a view similar to the FIG. 2, but taken from other aspect.
Figure 4:
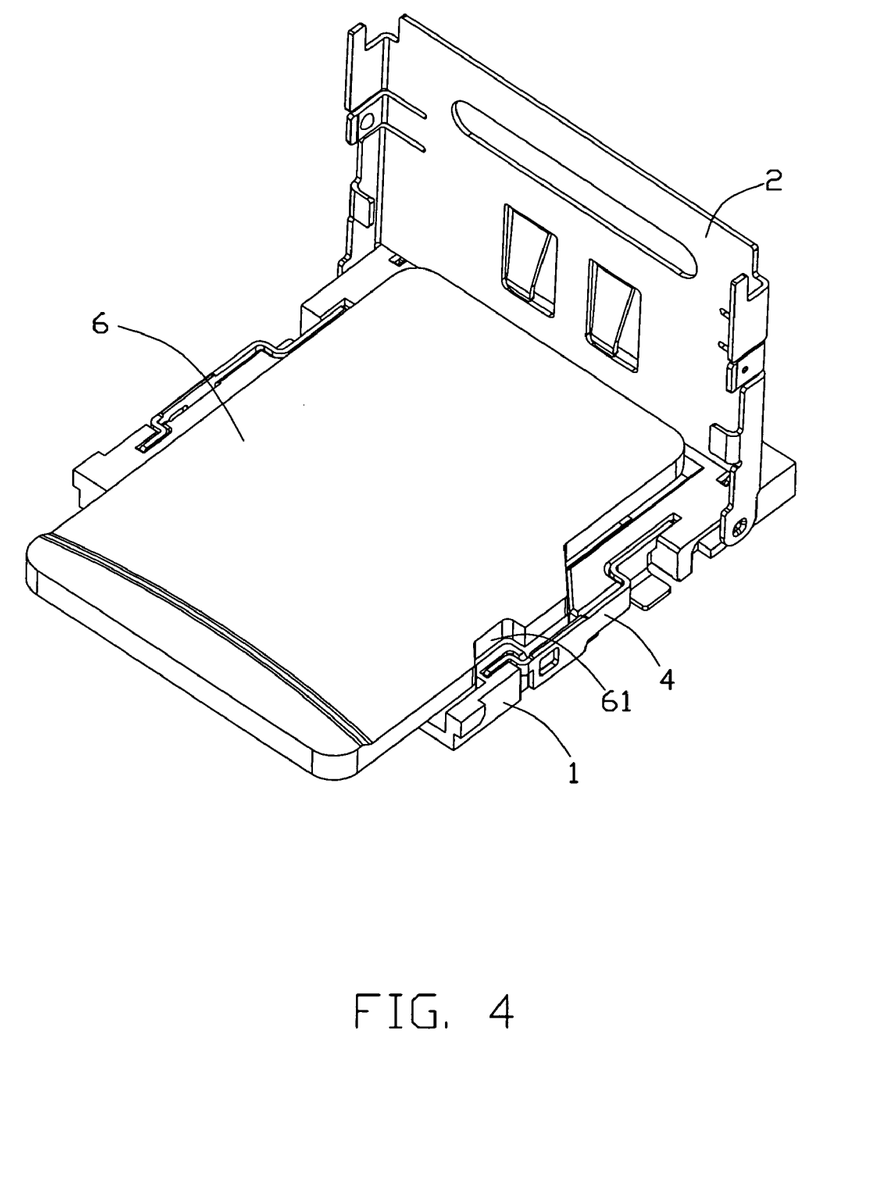
FIG. 4 is a perspective view of the electrical card connector, with the shell located in an opened position.
Figure 5:
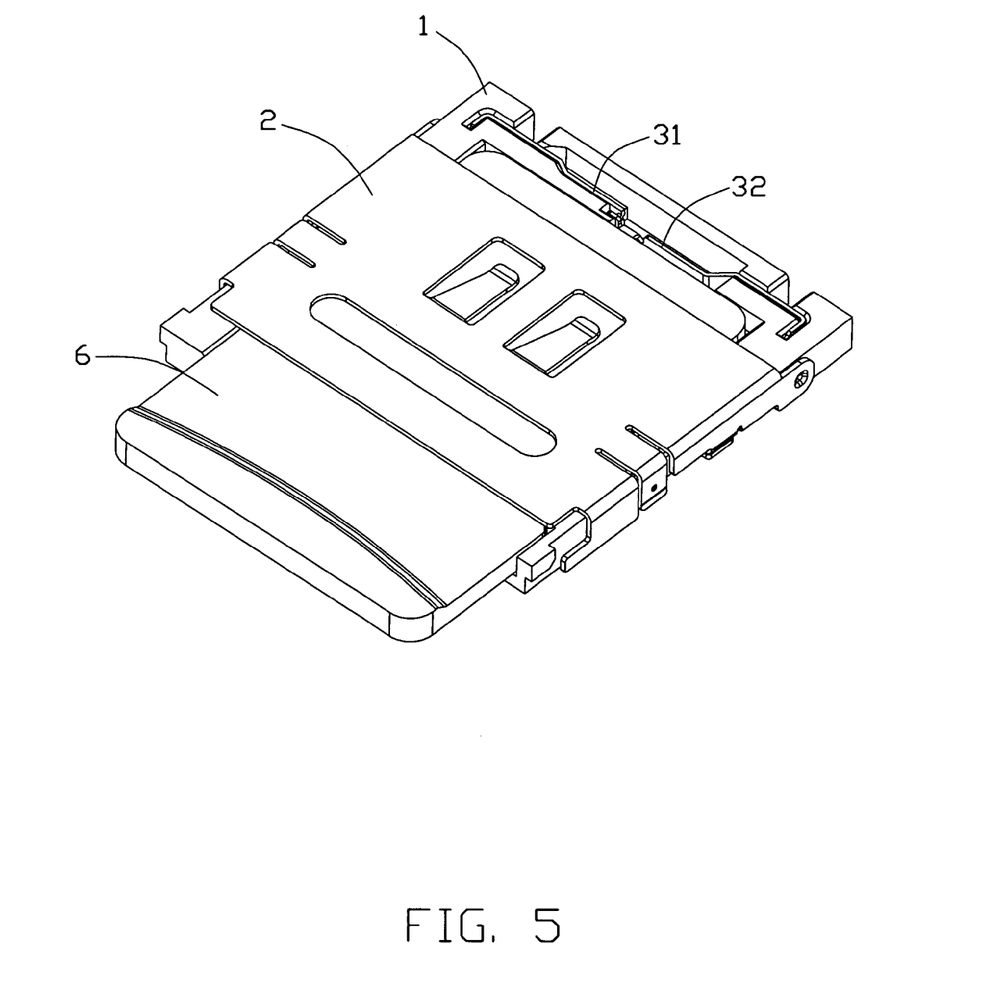
FIG. 5 is a perspective view of the electrical card connector, with the shell located in a closed, but unlocked position.
Figure 6:
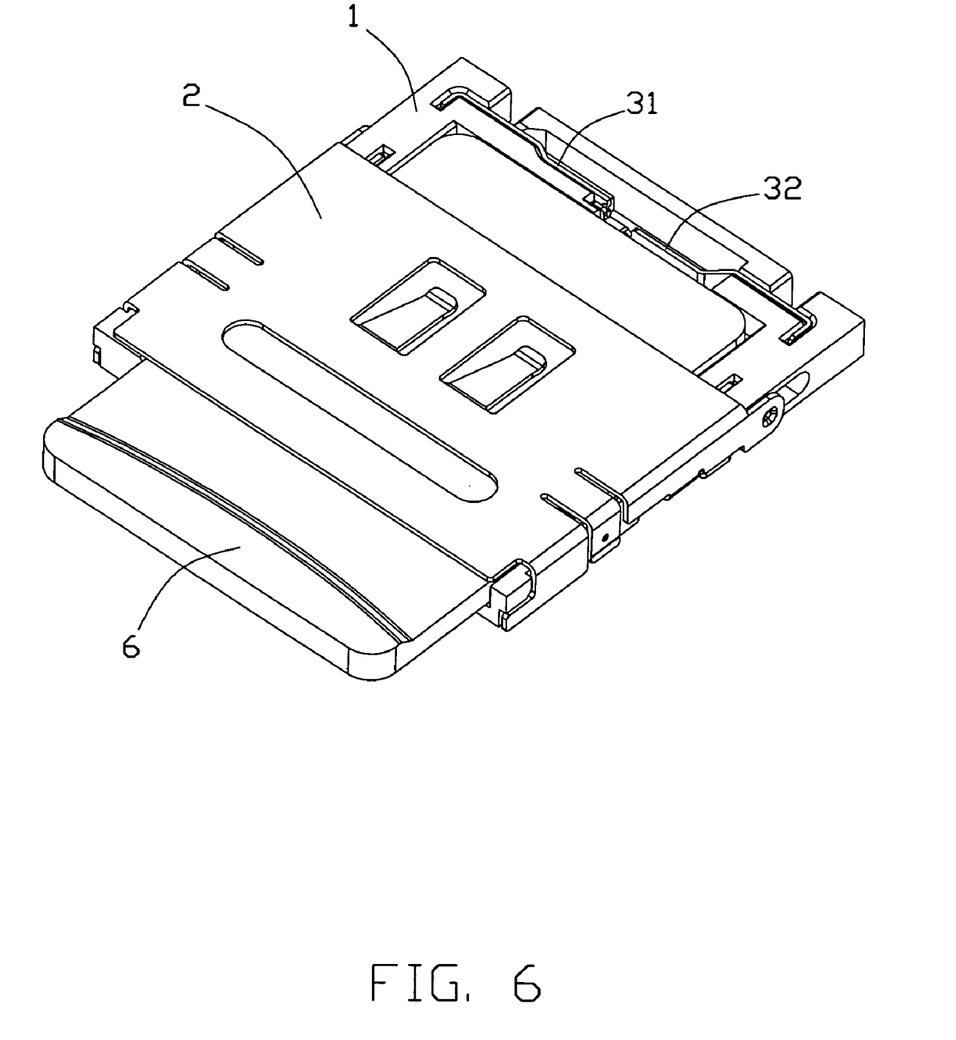
FIG. 6 is a perspective view of the electrical card connector with the shell located in a closed and locked position.
Figure 7:
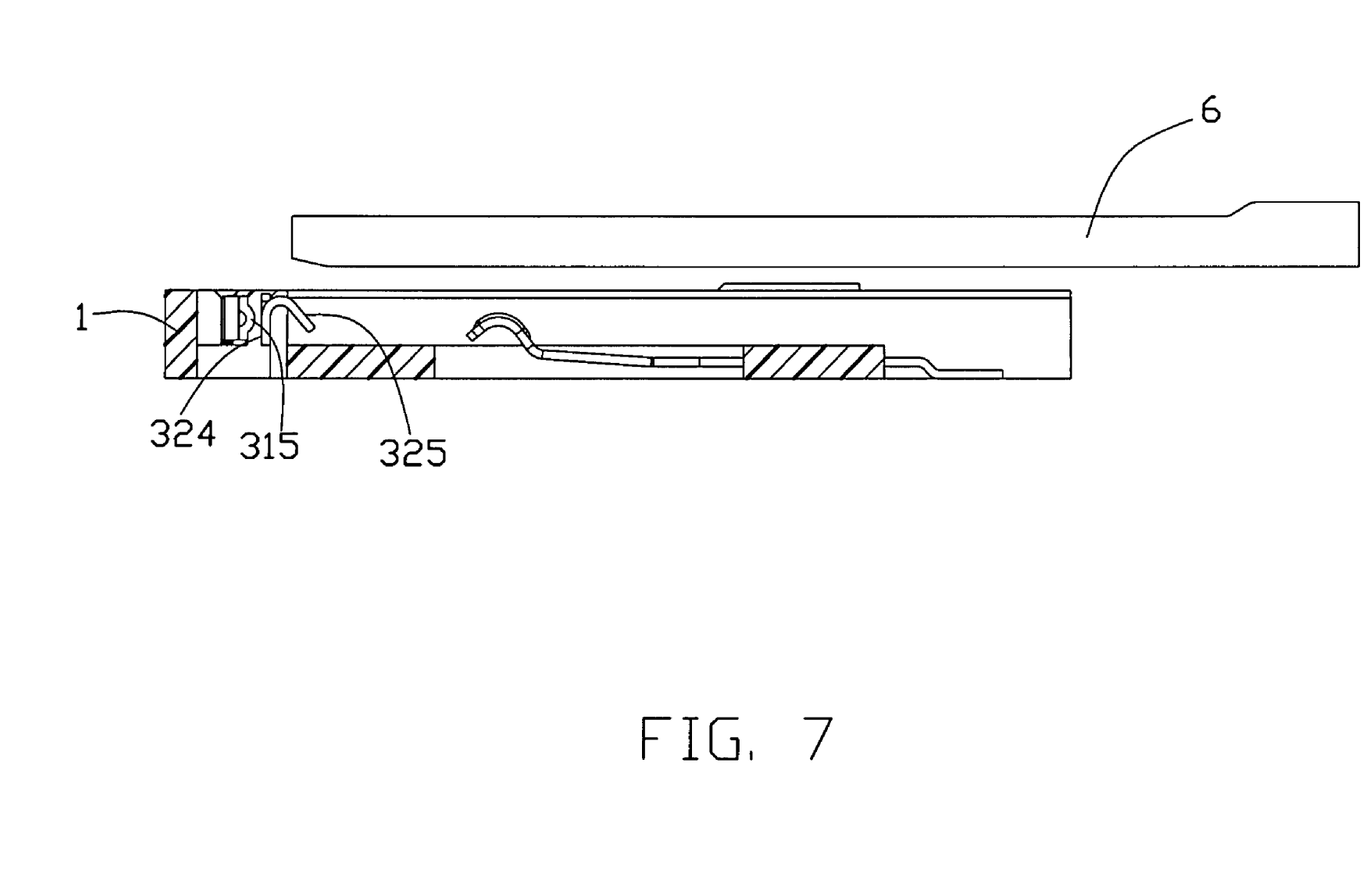
FIG. 7 is a cross sectional show of the electrical card connector before the electrical card inserted into the connector, with the detecting switch located in an opened position.
Figure 8:
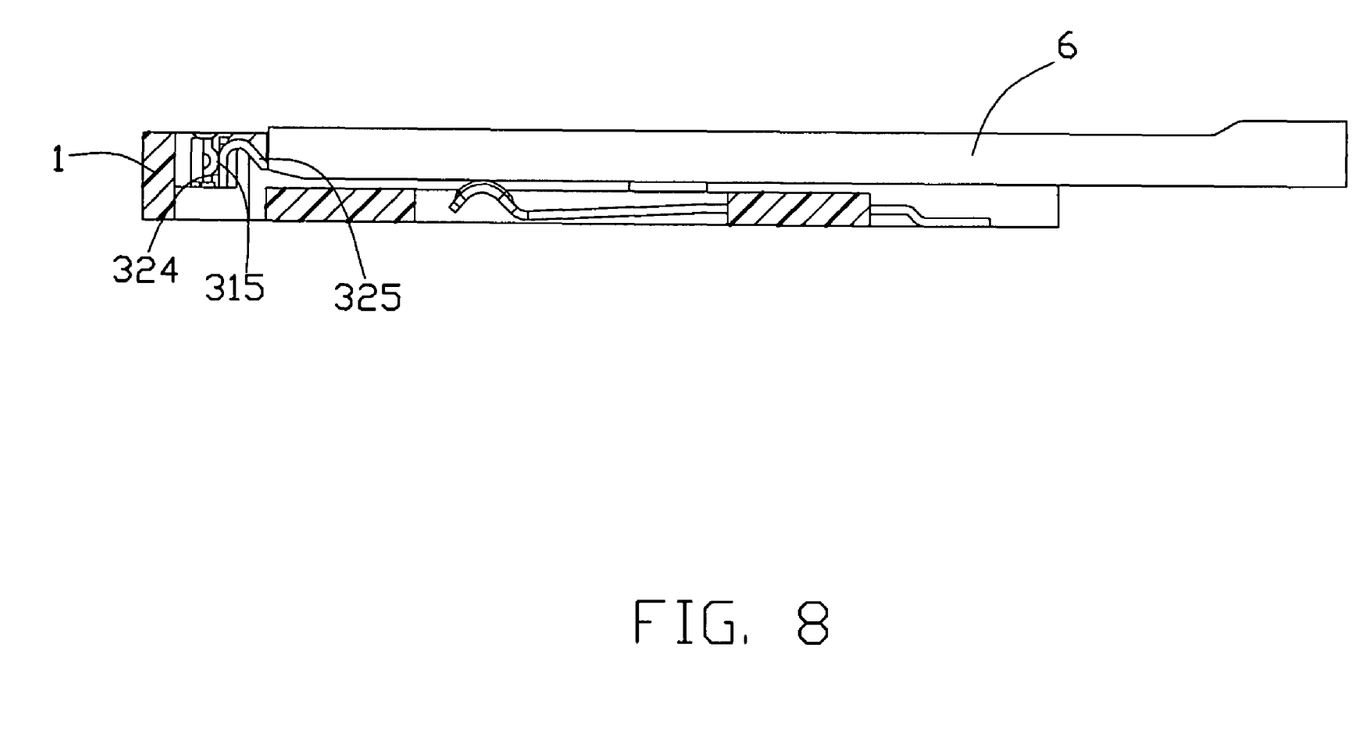
FIG. 8 is a cross sectional show of the electrical card connector after the electrical card is inserted into the connector, and with the detecting switch located in a closed position.

Referring to FIG. 2 to FIG. 4, the grounding piece 4 is made of metal and comprises a main portion 41, a pair of holding portions 42 located at the two ends of the main portion 41 and a grounding pad 43 extending outwardly from the bottom of the main portion 41. The main portion 41 forms a hole 410 for receiving the dimple 220 of the shell 2 when the shell 2 is locked thereto. The main portion 41 is mounted between the second side portion 12 of the housing 1 and the lateral side wall 26 of the shell 2 to avoid the shell 2 in contacting with the housing 1 directly. The holding portions 42 are received in the gaps 110 of the housing 1 for holding the grounding pieces 4 on the first side portion 11 and the second side portion 12.

Referring to FIG. 2 to FIG. 3, the contacts 5 are received in the base portion 14 of the housing 1, and comprises a contacting portion 51, a soldering portion 52 and a retaining portion 53 retained in the passageway 142 of the housing 1. The contacting portion 51 is disposed in the opening 141, which can move along the vertical direction within the opening 141.

Referring to FIG. 5 to FIG. 8, the detecting switch 3 is set to an opened position before the electrical card 6 is inserted into the receiving space 15. When the shell 2 is opened, the electrical card 6 is put into the receiving space 15 along the vertical direction to reduce the friction between the contacts 5 and the electrical card 6, and then the card 6 is positioned by the fixed portion 116 of the housing 1. The engaging portion 325 of the second contact 32 touches with the front edge of the electrical card 6, and moves into the cavity 135. The second contacting portion 324 of the second contact 32 is attached to the tuber 315 of the first contact 31 electrically. Then, the shell 2 is rotated as centered on the axial portion 24 to a closed position, then the shell 2 is further moved in the front-to-back direction to be locked. The latch 27 of the shell 2 engages with the locking member 115 of the housing 1 to keep the shell 2 in the closed position, at this moment, the dimple 220 of the shell 2 is retained in the hole 410 of the grounding piece 4 to limit the shell 2 to move in the front-to-back direction.

Figure 9:
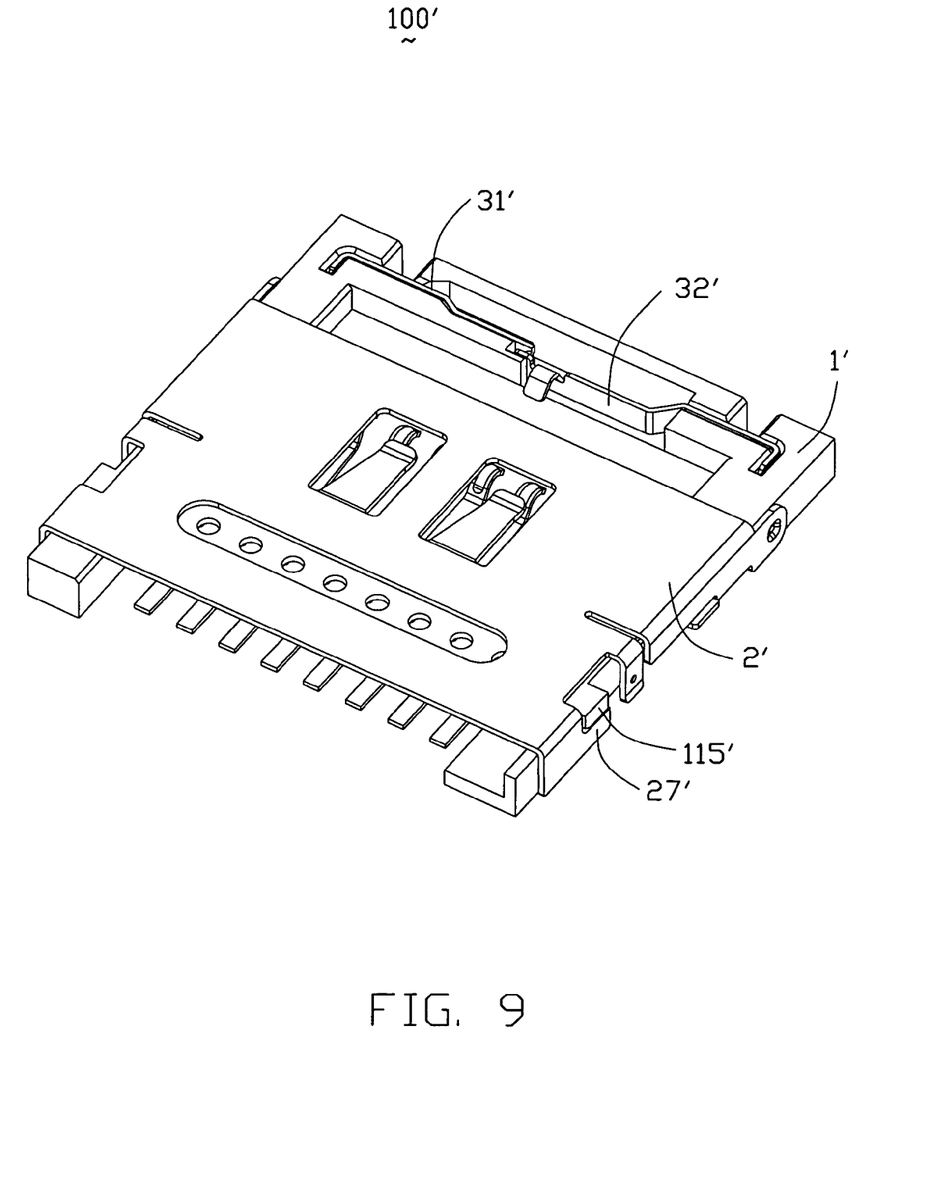
FIG. 9 is a perspective view of an electrical card connector according to a second embodiment of the invention.
Figure 10:
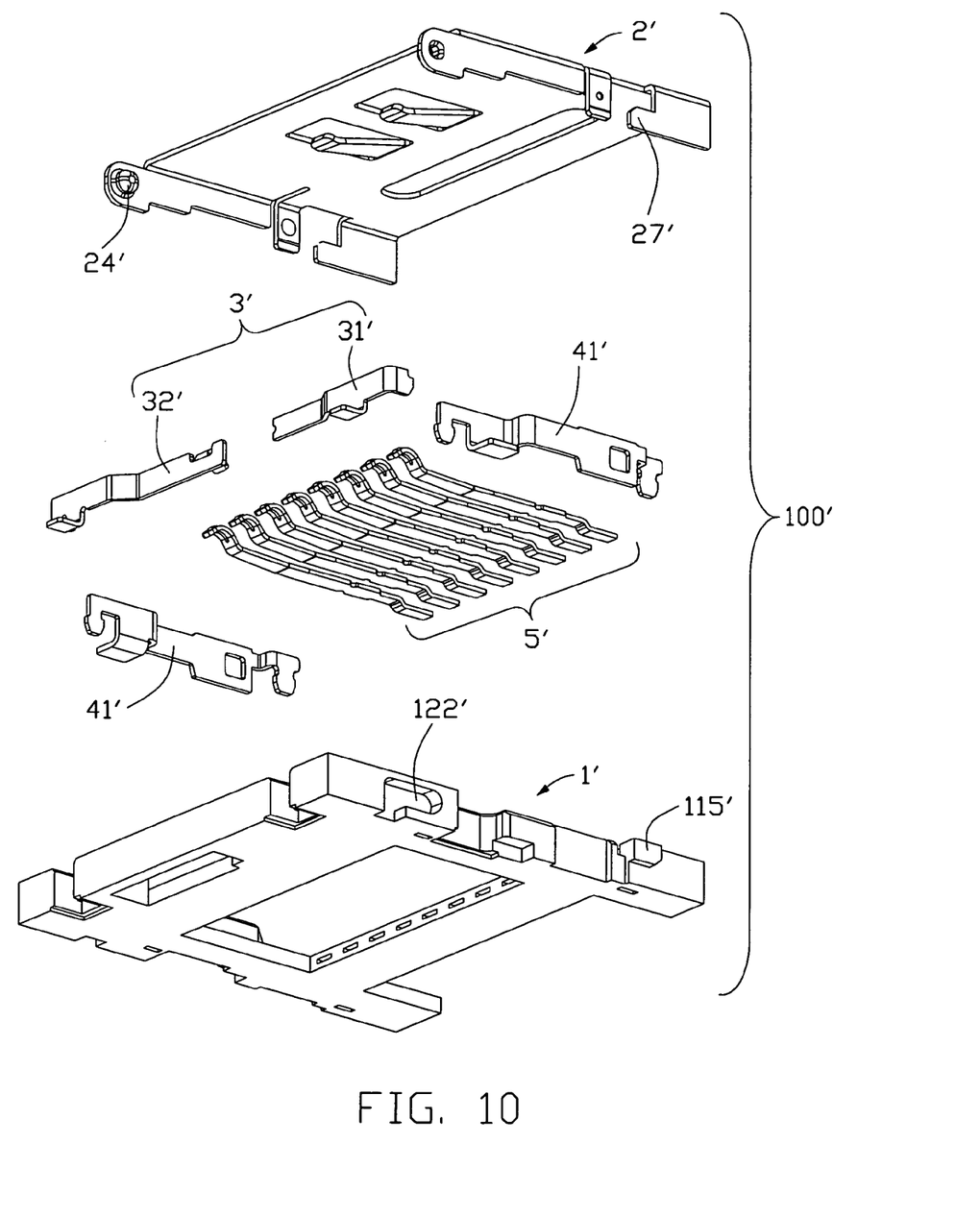
FIG. 10 an exploded, perspective view of the electrical card connector shown in FIG. 15.

FIGS. 9 and 10 show a second embodiment of the invention. Like reference numerals have been applied in FIGS. 9 and 10 corresponding to like components described above in relation to the first embodiment of FIGS. 1 to 8. Descriptions of those like components will not be repeated.

The main difference between the second embodiment of FIGS. 9 and 10 and the first embodiment of FIGS. 1 to 8 is that: the shell 2' is locked on the housing 1' when the shell 2' is pushed forwardly. Correspondingly, in the second embodiment the latch 27' of the shell 2' extends forwardly, and the housing 1' sets a locking member 115' mating with the latch 27'.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector, for receiving a card, comprising:
   an insulative housing defining a card receiving space, and comprising a plurality of side portions;
   a plurality of contacts received in the housing;
   a shell rotationally assembled to the housing to between an open position or a closed position; and
   a detecting switch mounted on one of the side portions of the housing, the detecting switch comprising a first contact and a second contact, the second contact comprising an engaging portion slantwise in an up-to-down direction and projecting into the receiving space;
   wherein the first contact and the second contact set to an opened position before the card is inserted into the receiving space, and the first contact and the second contact are closed after the card is inserted into the receiving space in a vertical direction and wherein the card is guided by the engaging portion during its insertion.

2. The electrical card connector as claimed in claim 1, wherein the detecting switch is retained on the side portion transversely.

3. The electrical card connector as claimed in claim 2, wherein the first contact comprises a first contacting portion and the second contact comprises a second contacting portion, the side portion forms a cavity for receiving the first contacting portion and the second contacting portion, and the cavity communicates with the receiving space.

4. The electrical card connector as claimed in claim 3, wherein the engaging portion of the second contact moves away from the receiving space into the cavity after the electrical card is inserted into the receiving space.

5. The electrical card connector as claimed in claim 4, wherein the first contacting portion comprises a tuber at the free end thereof, and the second contact is attached to the tuber after the electrical card is inserted into the receiving space.

6. The electrical card connector as claimed in claim 1, further comprising a pair of grounding pieces retained on lateral side portions of the housing, and the grounding pieces are disposed between the lateral side portion and the shell.

7. The electrical card connector as claimed in claim 6, wherein the grounding piece comprises a hole, and the shell forms a dimple for mating with the hole to lock the shell in a front-to-back direction.

8. The electrical card connector as claimed in claim 7, wherein the lateral side portion comprises a fixed portion projecting into the receiving space to limit the electrical card to being put into the receiving space in the vertical direction only.

9. The electrical card connector as claimed in claim 8, wherein the shell comprises a top wall and a pair of lateral side walls extending downwardly from the opposite sides of the top wall, the lateral wall forms a latch, and the lateral side portion of the housing comprises a locking member for mating with the latch to lock the shell in the vertical direction.

10. The electrical card connector as claimed in claim 9, wherein the housing comprises a base portion, the base portion forms a plurality of passageways and an opening located at the front of the passageway, and the contact comprises a contacting portion received in the opening.

11. An electrical card connector assembly comprising:
an insulative housing defining a socket located at a front portion thereof and extending in a front-to-back direction;
a plurality of contacts received in the housing; and
a shell rotationally assembled to the housing and comprising an axial shaft located at the front thereof and movable back and forth in the socket between open and closed positions;
said housing defining a card receiving cavity with a configuration, in a top view, which only allows a correct card to be downwardly disposed in the card receiving cavity when the axial shaft of said shell is located in the open position and the shell is rotated to a lifted manner to expose said card receiving cavity under condition that the card is independent from the shell during installation into the housing; wherein
the shell comprises a latch and the housing sets a locking member mating with the latch to prevent the shell from up and down moving when the axial shaft of said shell is located at the closed position and the shell is rotated to a lowered manner; wherein
the socket defines a window in a bottom face of the housing through which the shaft is allowed to be moved into the socket during assembling; wherein the closed position is located behind the open position in the front-to-back direction; wherein
the window is located closer to the closed position than to the open position in the front-to-back direction.

12. The electrical card connector assembly as claimed in claim 11, wherein the window is essentially located in a rear section of the socket in said front-to-back direction.

13. An electrical card connector assembly comprising:
an insulative housing defining a front-to-back direction thereof;
a plurality of contacts received in the housing; and
a shell rotationally assembled to the housing and being movable back and forth in a socket between open and closed positions;
said housing defining a card receiving cavity with a configuration, in a top view, which only allows a correct card to be disposed in the card receiving cavity downwardly when said shell is located in the open position and rotated to a lifted manner to expose said card receiving cavity under condition that the card is independent from the shell during installation into the housing;
the socket structure being formed in one of a front portion of the shell and a front portion of the housing, and an axial shaft being formed on the other of said front portion of the shell and the front portion of the housing and moveable received in said socket; wherein
the shell comprises a latch and the housing sets a locking member mating with the latch to prevent the shell from up and down moving when said shell is located at the closed position and rotated to a lowered manner; wherein
the socket defines a window communicating downwardly with an exterior, through which the shaft is inserted into the socket during assembling; wherein
the window is closer to the closed position than to the open position in said front-to-back direction.

14. The electrical card connector assembly as claimed in claim 13, wherein said socket is formed in the housing while the shaft is formed on the shell.

15. The electrical card connector assembly as claimed in claim 13, wherein said closed position is located behind the open position.

16. The electrical card connector assembly as claimed in claim 13, wherein the window is essentially located in a rear section of the socket in said front-to-back direction.

* * * * *